United States Patent
Trautenberg

(10) Patent No.: US 7,138,942 B2
(45) Date of Patent: Nov. 21, 2006

(54) PROCESS AND APPARATUS FOR CREATION OF ESTIMATED NAVIGATION SIGNAL ERROR INFORMATION

(75) Inventor: Hans Ludwig Trautenberg, Neumarkt (DE)

(73) Assignee: EADS Astrium GmbH, Munich (DE)

( * ) Notice: Subject to any disclaimer, the term of this patent is extended or adjusted under 35 U.S.C. 154(b) by 86 days.

(21) Appl. No.: 10/672,080

(22) Filed: Sep. 29, 2003

(65) Prior Publication Data

US 2004/0178953 A1 Sep. 16, 2004

(30) Foreign Application Priority Data

Sep. 30, 2002 (DE) ................ 102 45 967

(51) Int. Cl.
*G01S 5/14* (2006.01)
(52) U.S. Cl. .................... 342/357.02; 342/358
(58) Field of Classification Search ........... 342/357.02, 342/358
See application file for complete search history.

(56) References Cited

U.S. PATENT DOCUMENTS

| | | | |
|---|---|---|---|
| 6,040,798 A | 3/2000 | Kinal et al. | |
| 6,114,992 A | 9/2000 | Underbrink | |
| 6,323,803 B1 | 11/2001 | Jolley et al. | |
| 6,324,474 B1 | 11/2001 | Beisner et al. | |
| 6,502,042 B1 * | 12/2002 | Eid et al. ................ | 702/50 |

FOREIGN PATENT DOCUMENTS

| | | |
|---|---|---|
| DE | 3401090 | 1/1984 |
| DE | 4136136 | 11/1991 |
| DE | 19636425 | 9/1996 |
| DE | 19536601 | 3/1997 |
| DE | 19731103 | 1/1999 |
| DE | 19812426 | 9/1999 |
| DE | 19919249 | 11/2000 |

OTHER PUBLICATIONS

G. Chen et al., Multiple model carrier phase DGPS/INS for automotive applications, IEEE/AFCEA Information Systems for Enhanced Public Safety and Security Conference, p. 86-87, May 2000.*
A. Jouan et al., Signal and Data Processing of Small Targets, Proceedings-of-the-SPIE-The-International-Society-for-Optical-Engineering (USA), vol. 3373, p. 247-258, 1998.*
I.-H. Whang et al., MAP tracking filter for a maneuvering target, Transactions-of-the-Korean-Institute-of-Electrical-Engineers (South Korea), vol. 44(10), p. 1329-1333, Oct. 1995.*
M.A. Zaveri et al., Tracking multiple maneuvering point targets using multiple filter bank in infrared image sequence, International Conference on Multimedia and Expo, vol. 2, p. 369-372, Jul. 2003.*

(Continued)

*Primary Examiner*—Thomas H. Tarcza
*Assistant Examiner*—Fred H. Mull
(74) *Attorney, Agent, or Firm*—Crowell & Moring LLP

(57) ABSTRACT

A system for determining estimated navigation signal error information. Several error models are used by the evaluation unit, and, as a function of at least one defined selection standard, one of the several error models is selected. In determining the estimated navigation signal error information, the selected error model is applied to the received navigation signals, and the determined error information is transmitted to the radio navigation system and/or to user terminals.

20 Claims, 1 Drawing Sheet

OTHER PUBLICATIONS

K. P. Schwarz et al., "Aided Versus Embedded: A comparison of Two Approaches to GPS/INS Integration", Position Location and Navigation Symposium, IEEE, Las Vegas, Nevada Apr. 11-15, 1994, pp. 314-322.

Sinpyo Hong, et al., "Estimation of errors in INS with multiple GPS ant", Industrial Electronics Society, 2001. IECON 27th Annual Conference of the IEEE, Nov. 29-Dec. 2002, 2001 Denver, CO, vol. 1, pp. 410-415.

S.P. Pullen et al., "Global Optimization of GPS Augmentation Architectures Using Genetic Algorithms", *ION* GPS-95, Palm Springs, California, Sep. 1995, which can be retrieved in the Internet under: http://einstein.stanford.edu/gps/PDF/global_optimize_spp95.pdf.

W. Werner, "Towards Global Integrity", International Symposium on Kinematic Systems, in *Geodesy, Geomatics and Navigation*, KIS 2001, Jun. 5-8, 2001, Banff, Canada, which can be retrieved in the Internet under: http://www.ifen.com/publications/KIS2001.Paper.pdf.

European Search Report Dated Nov. 1, 2005, with English Translation of relevant portion (Three (3) Pages).

* cited by examiner

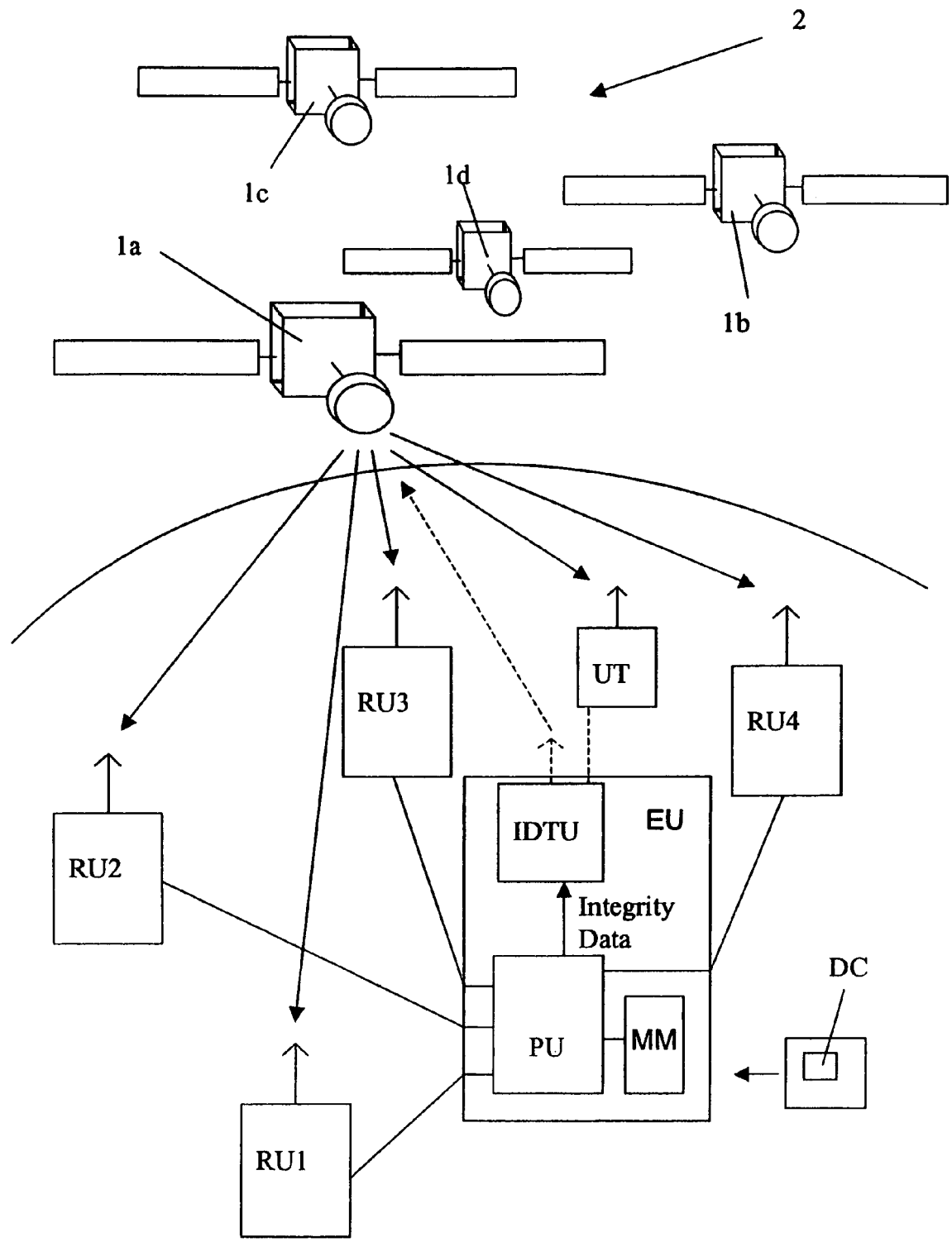

PROCESS AND APPARATUS FOR CREATION OF ESTIMATED NAVIGATION SIGNAL ERROR INFORMATION

BACKGROUND AND SUMMARY OF THE INVENTION

This application claims the priority of German Patent Application DE 102 45967.3, filed Sep. 30, 2002, the disclosure of which is expressly incorporated by reference herein.

The present invention relates to the problem of determining estimated navigation signal error information, in which case several receiver units receive navigation signals of at least one navigation signal transmission unit and at least one evaluation unit evaluates the received navigation signals. The navigation signal error information is finally transmitted directly or indirectly to user terminals of a radio navigation system so that the user terminals are informed on the basis of the error information, for example, of the precision of measurements which were carried out on the basis of received navigation signals. A radio navigation system can be implemented, for example, by means of terrestrial navigation signal transmission units or by means of navigation satellites or other aerodynamic vehicles as navigation signal transmission units.

From the state of the art, such measures are already basically known, as indicated, for example, in U.S. Patent Document U.S. Pat. No. 6,114,992. In order to determine navigation signal error information, according to the measures from the state of the art, one specific error model is used in each case which is applied to received navigation signals. This will be briefly explained using the example of satellite navigation systems. Concerning the corresponding state of the art, reference is made, for example, to the above mentioned U.S. Patent Document U.S. Pat. No. 6,114,992 as well as to S. P. Pullen et al., "Global Orientation of GPS Augmentation Architectures Using Genetic Algorithms", ION GPS-95, Palm Springs, Calif., September 1995, which can be retrieved in the Internet under:

http://einstein.stanford.edu/gps/PDF/global_optimize_spp95.pdf and to W. Werner, "Towards Global Integrity", International Symposium on Kinematic Systems, in *Geodesy, Geomatics and Navigation*, KIS 2001, Jun. 5–8, 2001, Banff, Canada, which can be retrieved in the Internet under:

http://www.ifen.com/publications/KIS2001_Paper.pdf

Position errors of the satellite position as well as clock errors of the satellite clocks may occur in the case of satellite navigation systems. In the prior art, the maximal projection of the position error and clock error of the individual signals in the application range of the navigation system so far have either been modeled as a scalar linear function of the longitude and latitude; as a scalar linear function of the North and East value in a plane reference system, in which the signal source is situated precisely in a normal manner over the origin of the reference system; as a maximal projection of the four-dimensional position error and clock error; or as a maximal of a three dimensional error with the first two components representing the error in the North or East direction and the third component representing the clock or altitude error. Thus, this third component assumes either a spatial or a time-related character which is defined once for the algorithm for determining the navigation signal error information. The scalar estimation has the disadvantage that it does not work for large coverage areas. The four-dimensional estimation has the disadvantage that clearly more observations are required than for the three-dimensional estimation. The three-dimensional estimations suggested so far have the disadvantage that the defining of the type of the third component has to take place a priori but the optimal character of the third component changes with the time and the user position. The estimation as a scalar linear function of the North and East value has the disadvantage that it frequently supplies a poorer error description than the two three-dimensional processes.

It is an object of the present invention to provide possibilities for determining estimated error information for navigation signals of at least one navigation signal transmission unit, which can be implemented with a very brief observation time and with as few receiver units as possible.

A first object of the present invention is a process of determining estimated navigation signal error information, in which case several receiver units receive navigation signals of at least one navigation signal transmission unit and at least one evaluation unit evaluates the received navigation signals. Furthermore, in the case of this process, a—direct or indirect—transmission of navigation signal error information takes place to user terminals of a radio navigation system. An indirect transmission may take place, for example, in that navigation signal error information is first transmitted to other devices —inside or outside the radio navigation system.

The process according to the invention is characterized in that the evaluation unit uses several error models with one of the models being selected as a function of at least one defined selection standard. The selected error model for determining the estimated navigation signal error information is applied to the received navigation signals and the determined error information is transmitted to the radio navigation system and/or to user terminals.

If the error information is first transmitted to the radio navigation system and not directly to the user terminals, suitable agents of the radio navigation system can take over the transmission of the error information to the user terminals in a manner known per se.

The invention has the advantage that, instead of a rigid selection of an error model, a flexible or even a dynamic selection of error models takes place. The selection of the error model can take place either at certain points in time or periodically, and therefore, in a time-event-controlled manner. However, it can also take place in a manner which is controlled by certain actual events or signalings.

The selection according to the invention of the error models ensures that the most suitable error model is selected, and that, in addition to the error estimation of the navigation signals, preferably also the corresponding error of the respective error estimation can be estimated and taken into account. Furthermore, as a result of the selection of the suitable error model, a sufficient precision of the process can be achieved also by means of a lower number of receiver units and, on the other hand, an error model can be selected which guarantees as few errors as possible for a range of an reception area for navigation signals which is as large as possible.

In particular, the process can be designed such that the error models have a first number of error components which all error models have in common, and have a second number of individual error components which are individually defined for each error model. Thus, the error models preferably do not differ in all error components but only in some components which can be alternatively selected, whereas other error components remain the same. Examples of such error components are the initially mentioned errors in the North or East direction and the clock or altitude error.

This process can also be further developed so that the individual error components occur as linear combinations of defined basic error components. Thus, in addition to the previously customary, initially mentioned pure error components, mixed error components may also be provided which result from basic error components. Such basic error components may be the previously customary, initially mentioned pure error components. Thus, for example, a mixed spatial/time-related error component can be formed from the previously customary, initially mentioned pure error components. It can therefore be provided that the basic error components comprise at least one spatial error component and at least one time-related error component. As a result, the variation possibility of the process and thus finally the accuracy can be further optimized.

In principle, any suitable standard can be used as the defined selection standard, which permits a determination of the error model in the desired manner.

For example, the variance of the estimated navigation signal error information on a reference grid in a defined reception area can be used as a defined selection standard. However, the sum of the amounts or of the squares of the estimated navigation signal error information at the locations of the receiver units can also be used as the defined selection standard. In another alternative, the maximum of the amounts or of the squares of the estimated navigation signal error information at the locations of the receiver units is used as the defined selection standard. However, the integral with respect to the amount or the squares of the estimated navigation signal information in the defined reception area can also be used as the defined selection standard. Finally, as an alternative, the maximum of the amounts or of the squares of the estimated navigation signal error information in the defined reception area can also be used as the defined standard.

The aforementioned selection standards represent some examples of suitable selection standards. However, this listing is not final, so that other selection standards may also be chosen within the scope of the present invention.

In order to achieve another degree of freedom when optimizing the error information, it may be provided that the estimated navigation signal error information is weighted in a local and/or time-related manner. Thus, it can, for example, be provided that the estimated navigation signal error information is weighted as a function of the density of the user terminals in the reception area. The weighting can also take place as a function of other factors.

Another object of the present invention is an evaluation unit for evaluating navigation signals of a radio navigation system. According to the invention, the evaluation unit includes an error model memory for storing error models for received navigation signals of the radio navigation system; a processing unit constructed for the selection of an error model as a function of a defined selection standard and for the application of the selected error model to received navigation signals; and a device for transmitting navigation signal error information to the radio navigation system and/or to user terminals.

The corresponding advantages of the invention occur analogously to the above-described advantages of the process according to the invention.

As indicated above, radio navigation systems can be constructed in different ways with the evaluation units being adapted correspondingly. Thus, for example, the evaluation unit can be constructed as an evaluation unit of at least one satellite navigation system. Furthermore, the evaluation unit can be constructed such that it is adapted for the implementation of individual or several of the above-mentioned process steps.

Another object of the present invention is a computer program for determining estimated navigation signal error information of a radio navigation system. The computer program is constructed for an interaction with devices of an above-mentioned evaluation unit. The computer program further being constructed for controlling the reading of several error models out of an error model memory; for selecting one of the several error models as a function of at least one defined selection standard; for determining the estimated navigation signal error information while applying the selected error model to the received navigation signals; and for controlling the transmission of determined error information to the radio navigation system and/or to user terminals.

Another object of the present invention is a computer program product containing a machine-readable program carrier on which an above-mentioned computer program is stored in the form of electronically readable control signals. The control signals may be stored in any suitable form with the corresponding electronic reading taken place by electric, magnetic, electromagnetic, electro-optical or other electronic methods. Examples of such program carriers are magnetic tapes, floppy disks, hard disks, CD-ROMs or semiconductor devices.

Other objects, advantages and novel features of the present invention will become apparent from the following detailed description of the invention when considered in conjunction with the accompanying drawings.

BRIEF DESCRIPTION OF THE DRAWINGS

In the following, a special embodiment of the present invention is explained by means of the FIGURE within the framework of a satellite navigation system.

The sole FIGURE provides a view of a satellite navigation system, of receiver units and of an evaluation unit for determining estimated navigation signal error information.

DETAILED DESCRIPTION OF THE PREFERRED EMBODIMENT

The FIGURE illustrates a satellite navigation system 2 which consists of several navigation satellites $1a$, $1b$, $1c$, $1d$ which are each in a corresponding orbit around the earth. These navigation satellites $1a$, $1b$, $1c$, $1d$ emit navigation signals which can be received on the earth by corresponding receiver units. One example of such receiver units are user terminals UT. The FIGURE shows additional receiver units RU1, RU2, RU3, RU4 which, with respect to data, are connected with an evaluation unit EU. The evaluation unit EU has an error model memory MM in which several error models for received navigation signals of the radio navigation system 2 are stored. With respect to the data, the error model memory MM is connected with a processing unit PU which is constructed for selecting one of the error models stored in the error model memory MM as a function of a defined selection standard and for the application of the selected error model to navigation signals which were received by means of the receiver units RU1, RU2, RU3, RU4 and were transmitted to the processing unit PU. On the basis of the selected error model and of the received navigation signals, the processing unit PU generates estimated navigation signal error information in the form of integrity data. Such integrity data are basically known from the prior art. These integrity data are transmitted by the estimation unit EU by means of a corresponding device (integrity data transmission unit) IDTU either directly to user terminals UT or to suitable devices of the satellite navigation system 2.

The estimation unit EU can be set up particularly by means of a computer program for the determination of estimated navigation signal error information, thus of integrity data, of the satellite navigation system according to the above-described method when the other hardware prerequisites exist in the estimation unit. Particularly while interacting with the processing unit PU, the error model memory MM and the transmission unit IDTU, the computer program will then permit the control of the reading-out and the selection of error models from the error model memory, the determination of the integrity data on the basis of the selected error model and of the received navigation signals as well as the control of the transmission of the integrity data. The computer program can preferably be entered into the evaluation unit EU by means of a computer program product, in which case the computer program unit contains a machine readable data carrier DC on which the computer program is stored in the form of electronically readable control signals. Examples include a chip card or a similar carrier with a semiconductor chip, in which the computer program is stored, or a CD-ROM. However, all other suitable types of computer program products can also be used.

In the following, an example, will be shown of the concrete determination of estimated navigation signal error information which takes place in an evaluation unit. Naturally, other determination processes are also conceivable, which will easily be revealed to a person skilled in the art.

1. A first step includes the selection of configuration parameters alpha and gamma, for example, (0,1), (1,0), (2,−1), (−1,2), (0.5,0.5). . . . These configuration parameters are used for forming linear combinations of two possible basic error components; in this case, a spatial (radial) and a time-related (clock error) basic error component, for the third of three error components. Two of the three error components remain the same (spatial error in the North direction and East direction); whereas, a third error component is formed by a suitable linear combination of two basic error components and modified in the process.

2. In a second step, a design matrix is established. For this purpose, the following input data are used:

| | |
|---|---|
| xs, ys, zs | Nominal position of a navigation signal transmission unit; thus, here, of a satellite, in ECEF coordinates (earth centered, earth fixed); here, only for a navigation signal transmission unit |
| xr, yr, zr | Positions of receiver units in ECEF coordinates, contained in a vector of the length m |
| alpha, gamma | Configuration parameters |

The following computations are now made:

$dx=xs-xr;$ $dy=ys-yr;$ $dz=zs-zr;$ $cx=ys*zr-zs*yr;$ $cy=zs*xr-xs*zr;$ $cz=xs*yr-ys*xr;$ $ps=sqrt(xs.*xs+ys.*ys);$ $Rs=sqrt(xs.*xs+ys.*ys+Zs.*Zs);$ $dR=sqrt(dx.*dx+dy.*dy+dz.*dz);$ $East=cz./(ps*dR);$ $Up=(xs.*dx+ys.*dy+zs.*dz)./(Rs*dR);$ As a result, a design matrix X is formed in which the above-computed data are summarized as follows:

$X=[East, North, alpha.*ones(size(East))+ gamma.*Up];$

The result of this computing step is therefore:
X Design matrix of the size (m,3)

3. In a third step, the estimation of three error components of the navigation signal error information takes place on the basis of the determined positions. For this purpose, the following input data are used:

| | |
|---|---|
| X | Design matrix of the size (m,3) |
| P | Weighting of measurements for various receiver units in the form of a diagonal matrix of the size (m,m) |
| y | position measurements for the various receivers, contained in a vector of the length m |

This third step represents a least square process. The following computations are carried out:

$G=Cholesky\ factorization\ (P);$ $X=G*X;$ $y=G*y;$ $varCov=inv(X.'*X);$ $beta=varCov*X.'*y;$ $e=X*beta-y;$ $n=length(y);$ $u=length(beta);$ $sigma2=e.'*e/(n-u);$ $varCov=sigma2.*varCov;$ The following is the result of this computing step:

| | |
|---|---|
| beta | Vector with the estimated error in the East direction (East), in the North direction (North) and another estimated error component for the corresponding navigation signal transmission unit, thus the corresponding satellite |
| varCov | Variance-covariance matrix for the estimated components in beta |

4. Then the design matrix from Step 2 is computed again, but in this case the positions of the receiver units are replaced by positions for which the estimated navigation signal error information is to be determined, for example, for a reference grid in the defined reception area.

5. Estimated navigation signal error information e_err and the corresponding standard deviation e_sig of this navigation signal error information is then computed according to $$e\_err = beta'* X$$

$$e\_sig = sqrt(dot(X, varCov*X))$$

6. Now, for example, the maximum of e_err on the reference grid for the above-selected combination of on(? translator) alpha and gamma is determined.

7. Then, the minimum of e_err and a value e_err_min is determined and is stored in e_err_min. If this step is carried out for the first time, e_err_min is first equated with e_err.

8. Now, a new combination of configuration parameters alpha and gamma is selected and Step 2 is implemented again or the procedure is terminated if all defined combinations of configuration parameters alpha and gamma have been used once.

9. e_err_min is then obtained as the maximal estimated navigation signal error. The corresponding error model with three error components is obtained from the North error, the East error and the linear combination of the basic error components based on the combination of the configuration parameters alpha and gamma which is part of the corresponding value of e_err=e_err_min.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for determining estimated navigation signal error information, comprising the steps of:
   providing a plurality of receiver units (RU1, RU2, RU3, RU4) receiving navigation signals from at least one navigation signal transmission unit;
   providing at least one evaluation unit (EU) for evaluating the received navigation signals, and for transmitting navigation signal error information to user terminals (UT) of a radio navigation system;
   providing the evaluation unit (EU) with a plurality of error models;
   selecting one of said plurality of error models as a function of at least one defined selection standard;
   applying the selected error model for the determination of the estimated navigation signal error information to the received navigation signals; and
   transmitting the determined error information to at least one of the radio navigation system and to user terminals (UT).

2. The process according to claim 1, wherein the estimated navigation signal error information is weighted at least one of locally and in a time-related manner.

3. The process according to claim 2, wherein the estimated navigation signal error information is weighted as a function of the density of the user terminals (UT) in a reception area.

4. The process according to claim 1, wherein a sum of one of the amounts and the squares of the estimated navigation signal error information at the locations of the receiver units (RU1, RU2, RU3, RU4) is used as the defined selection standard.

5. The process according to claim 1, wherein a maximum of one of the amounts and the squares of the estimated navigation signal error information at the locations of the receiver units (RU1, RU2, RU3, RU4) is used as the defined selection standard.

6. The process according to claim 1, wherein an integral with respect to one of an amount and the squares of the estimated navigation signal error information in the defined reception area is used as the defined selection standard.

7. The process according to claim 1, wherein a maximum of one of the amounts and the squares of the estimated navigation signal error information in the defined reception area is used as the defined standard.

8. The process according to claim 1, wherein the error models have a first number of error components which all error models have in common, and have a second number of individual error components which are individually defined for each error model.

9. The process according to claim 8, wherein the individual error components occur as linear combinations of defined basic error components.

10. The process according to claim 9, wherein the basic error components include at least one spatial error component and at least one time-related error component.

11. The process according to claim 10, wherein a variance of the estimated navigation signal error information on a referenced grid in a defined reception area is used as the defined selection standard.

12. The process according to claim 10, wherein a sum of one of the amounts and the squares of the estimated navigation signal error information at the locations of the receiver units (RU1, RU2, RU3, RU4) is used as the defined selection standard.

13. The process according to claim 9, wherein a variance of the estimated navigation signal error information on a referenced grid in a defined reception area is used as the defined selection standard.

14. The process according to claim 9, wherein a sum of one of the amounts and the squares of the estimated navigation signal error information at the locations of the receiver units (RU1, RU2, RU3, RU4) is used as the defined selection standard.

15. The process according to claim 8, wherein a variance of the estimated navigation signal error information on a referenced grid in a defined reception area is used as the defined selection standard.

16. The process according to claim 8, wherein a sum of one of the amounts and the squares of the estimated navigation signal error information at the locations of the receiver units (RU1, RU2, RU3, RU4) is used as the defined selection standard.

17. A process for determining estimated navigation signal error information, comprising the steps of:
   providing a plurality of receiver units (RU1, RU2, RU3, RU4) receiving navigation signals from at least one navigation signal transmission unit;
   providing at least one evaluation unit (EU) for evaluating the received navigation signals, and for transmitting navigation signal error information to user terminals (UT) of a radio navigation system;
   providing the evaluation unit (EU) with a plurality of error models;
   selecting one of said plurality of error models as a function of at least one defined selection standard;
   applying the selected error model for the determination of the estimated navigation signal error information to the received navigation signals; and
   transmitting the determined error information to at least one of the radio navigation system and to user terminals (UT) wherein a variance of the estimated navigation signal error information on a reference grid in a defined reception area is used as the defined selection standard.

18. An evaluation unit (EU) for evaluating navigation signals of a radio navigation system, comprising:
   an error model memory (MM) for storing error models for received navigation signals of the radio navigation system,
   a processing unit (PU) constructed for the selection of an error model as a function of a defined selection standard and for the application of the selected error model to received navigation signals, and
   a device (IDTU) for transmitting navigation signal error information to at least one of the radio navigation system and user terminals (UT).

19. The evaluation unit according to claim 18, wherein the evaluation unit (EU) is constructed as an evaluation unit of at least one satellite navigation system.

20. A computer program product containing a machine readable program carrier storing a computer program for determining estimated navigation signal error information of a radio navigation system, the computer program being constructed for an interaction with devices (PU, MM, IDTU) of an evaluation unit (EU) for evaluating navigation signals of a radio navigation system, comprising:
   an error model memory (MM) for storing error models for received navigation signals of the radio navigation system,
   a processing unit (PU) constructed for the selection of an error model as a function of a defined selection standard and for the application of the selected error model to received navigation signals, and
   a device (IDTU) for transmitting navigation signal error information to at least one of the radio navigation system and user terminals (UT), and the computer program furthermore being constructed
   for controlling the reading of several error models out of an error model memory (MM),
   for selecting one of the several error models as a function of at least one defined selection standard,
   for determining the estimated navigation signal error information while applying the selected error model to the received navigation signals, and
   for controlling the transmission of determined error information to the radio navigation system and/or to user terminals (UT).

* * * * *